US006425063B1

(12) United States Patent
Mattson et al.

(10) Patent No.: US 6,425,063 B1
(45) Date of Patent: Jul. 23, 2002

(54) METHOD AND ARRANGEMENT FOR MEMORY MANAGEMENT

(76) Inventors: Björn Axel Mattson, Södersunda, S-130 38, Runmarö ; Per Tobias Hofverberg, Älta Mossväg 3A, S-138 37, Älta; Kari Anders Hintukainen, Skarpbrunnavägen 45, S-145 64, Norsborg, all of (SE)

( * ) Notice: Subject to any disclaimer, the term of this patent is extended or adjusted under 35 U.S.C. 154(b) by 0 days.

(21) Appl. No.: 09/412,635

(22) Filed: Oct. 5, 1999

(30) Foreign Application Priority Data

Oct. 5, 1998 (SE) .............................. 9803370

(51) Int. Cl.[7] .............................. G06F 12/00
(52) U.S. Cl. .................. 711/167; 711/120; 711/162
(58) Field of Search ................. 711/120, 162, 711/167, 200, 141, 144; 714/10, 11, 820, 13; 709/216; 712/14; 710/74

(56) References Cited

U.S. PATENT DOCUMENTS

| | | | | |
|---|---|---|---|---|
| 3,970,993 A | * | 7/1976 | Finnila ........................ 712/14 |
| 5,276,823 A | * | 1/1994 | Cutts, Jr. et al. ............. 714/11 |
| 5,283,886 A | * | 2/1994 | Nishii et al. ................. 711/144 |
| 5,764,660 A | * | 6/1998 | Mohat ......................... 714/820 |
| 5,896,501 A | * | 4/1999 | Ikeda et al. .................. 709/216 |
| 5,978,570 A | * | 11/1999 | Hillis .......................... 711/200 |
| 5,987,571 A | * | 11/1999 | Shibata et al. .............. 711/141 |
| 6,061,750 A | * | 5/2000 | Beardsley et al. ............. 710/74 |
| 6,134,673 A | * | 10/2000 | Chrabaszcz ................... 714/13 |

* cited by examiner

*Primary Examiner*—David Hudspeth
*Assistant Examiner*—Fred F. Tzeng

(57) ABSTRACT

The present invention relates to a method and an arrangement for memory management, where a first memory 3 and a second memory 4 works in parallel, such as two memories belonging to a first 1 and a second 2 parallel working processor. Respective memory 3, 4 can be accessed for read and/or write instructions through a memory-bus 13, 24, in time slots correlated to instruction cycles of the execution work of the processors 3, 4. The second memory is to hold the same information as the first memory. The memory management comprises detecting free time slots on the memory-bus, and the management is only performed in such detected free time slots.

12 Claims, 1 Drawing Sheet

METHOD AND ARRANGEMENT FOR MEMORY MANAGEMENT

This application claims priority under 35 U.S.C. §§119 and/or 365 to 9803370-7 filed in Sweden on Oct. 5, 1998; the entire content of which is hereby incorporated by reference.

FIELD OF INVENTION

The present invention relates to a method and to an arrangement for memory management. The method and the arrangement are adapted to manage a first memory and a second memory that operate in parallel with each other, for instance two memories that belong to a first and a second parallel operating processor.

BACKGROUND OF THE INVENTION

The use of primary memories has long been known to the art. By primary memory is meant in this document a memory that will only retain its information content when a voltage is applied and which will lose: its information content when the voltage is removed, such memories also being designated Random Access Memories (RAMs).

In the case of a memory that coacts with a processor, it is also known to allow respective memories to be accessed for reading and/or writing purposes, through the medium of a connection referred to here as a memory bus, and in time slots that are correlated within instruction cycles associated with the execution work of the processors.

With respect to high reliability requirements of a system, it is also known to allow two mutually different processors to perform the same tasks in parallel with one another, so as to generate redundancy in the system. In such contexts, these processors can be referred to as an executing processor and a stand-by processor.

It is also known in such contexts that the memory or memories that coacts/coact with one processor shall contain the same information as the memory or memories that coacts/coact with the other processor. Since writing of information into the memories and reading of information therefrom can be at fault, it is also known to check parts of the memory content or the whole of said memory content continuously during operation of the processors, for instance by comparing the memory content on the executing side with the memory content on the stand-by side.

When large memories are concerned, the work involved is relatively capacity demanding, and consequently it is usual to check solely the memory content that is most important with respect to the work carried out by the processors.

It is also known when starting up one processor, for instance after a crash, after a service, or after upgrading one processor, to go through a start-up phase which comprises, inter alia, transferring the content of the memory/memories belonging to the still operating processor to the memory/memories belonging to the start-up processor.

The process of reading from one memory and writing into the other memory is capacity demanding and means that the processor will not be available for ordinary working purposes for some time.

It is also known that certain types of work data require uninterrupted processing, such as certain telecommunications applications.

It is also known to vary the load in telecommunications applications with time, and consequently applications that require uninterrupted processing are often allocated a processor capacity that is adapted to handle the highest load that occurs.

Moreover, the capacity requirement can change with respect to a given application, either: increase or decrease, and it is known to upgrade processor capacity in accordance with the new capacity requirements on such occasions.

SUMMARY OF THE PRESENT INVENTION

Technical Problems

When considering the earlier standpoint of techniques as described above, it will be seen that a technical problem resides in enabling a given memory to be managed without taking the capacity from the ordinary or standard tasks of the processor in the case of parallel operating processors and their respective primary memories Another technical problem is one of enabling a start-up phase, for instance in conjunction with service, upgrading, or a re-start after a crash of one processor and its associated memory, while the other processor continues to operate with undiminished capacity with respect to its ordinary tasks.

Another technical problem is one of enabling the memory content of one memory belonging to the operating processor to be transferred to another memory belonging to the start-up processor with undiminished capacity of the working processor in handling its ordinary tasks.

Another technical problem is one of handling changes that occur in the memory of the still operating processor in a manner so that the memory belonging to the start-up processor will also include the changed memory content.

In normal parallel operation between the two processors, another technical problem is one of checking continuously that the parallel operating memories have the same memory content without taking capacity from the ordinary working tasks of the processor to this end.

A further technical problem is one of providing the measures and means required to be able to use empty time slots on a memory bus acting between a processor and a memory for tasks other than the ordinary tasks of a processor.

Solution

With the intention of solving one or more of the aforesaid technical problems, the present invention takes as its starting point a memory managing method where a first and a second memory operate in parallel, such as two memories belonging to first and second parallel operating processors, where respective memories are accessed for reading and/or writing purposes via a so-called memory bus and in time slots correlated with instruction cycles associated with the execution work of the processors, and where the second memory shall contain the same information as the first memory.

With a starting point from such a method and with the intention of providing memory managing that does not take the capacity from the ordinary tasks of the processors, it is proposed in accordance with the invention that memory managing includes the detection of empty time slots in the memory bus, and that requisite memory managing is solely carried out in the detected empty time slots.

This means that during a start-up phase, which includes writing the content of the first memory into the second memory in conjunction with a new start or a re-start of the second processor and therewith the second memory, a memory content belonging to a first memory address in the first memory is read, in accordance with the invention, from the first memory and written to a corresponding memory address in the second memory in a first detected empty time slot.

The memory content belonging to a second memory address in the first memory is then read from the first memory and written to a corresponding memory address in the second memory in a second detected empty time slot, and so on until the memory content of the second memory is the same as the memory content in said first memory.

In order to enable the start-up phase to take place during continued operation of the first processor and to enable information to be written into the first memory to be processed under such conditions during the start-up phase, it is proposed in accordance with the invention that writing of information into memory addresses that have already been read and that belong to the first memory also takes place to the second memory during the start-up phase.

With the intention of further simplifying this managing process, it is proposed in accordance with the invention that all writing to a memory address in the first memory also takes place to a corresponding memory address in the second memory during the start-up phase.

When memory managing during normal parallel operation of the first and second processors also includes checking continuously that the whole or parts of the content of the second memory is the same as corresponding parts of the first memory, it is proposed in accordance with the invention that normal operation will also include detection of empty time slots in the memory bus, so as to enable said check to be carried out without using time slots from the ordinary tasks of the memory bus, and to check the memory content only during detected empty time slots.

Respective memories have related means which during a present time slot indicate whether or not the following time slot is empty. With the intention of enabling following empty time slots to be detected, it is proposed in accordance with the invention that this detection is effected by a check carried out by said means.

The present invention also includes a memory management arrangement adapted to operate in accordance with the aforesaid method.

Such an arrangement includes a first and a second memory which are adapted to operate in parallel, such as two memories belonging to respective first and second parallel operating processors, and a memory managing unit adapted to manage said two memories, wherein respective memories are adapted for reading and/or writing access via a so-called memory bus and in time slots correlated with instruction cycles pertaining to the execution work of said processors.

The second memory is adapted to contain the same information as the first memory.

According to the present invention, the arrangement includes a detecting unit which functions to detect empty time slots in the memory bus. The memory managing unit is also adapted to manage the memory solely in said detected empty time slots.

During a start-up phase in conjunction with a new start or a re-start of the second processor and therewith the second memory, the memory managing unit functions to write the memory content of the first memory into the second memory, by reading a memory content belonging to a first memory address in the first memory and writing said memory content to a corresponding memory address in the second memory in one of the empty time slots first detected by the detecting unit.

Similarly, the memory managing unit is adapted to read a memory content belonging to a second memory address in the first memory and write the memory content to a corresponding memory address in the second memory in one of the other empty time slots detected by the detecting unit, and so on until the memory content of said second memory is the same as the memory content of said first memory.

When the first processor is adapted to operate continuously during the start-up phase, the memory managing unit will function to write all that has been written to memory addresses that have already been read in the first memory to corresponding memory addresses in the second memory.

In this case, it is necessary to check which addresses have been read and those which have not been read. With the intention of simplifying memory management and avoiding the necessity of checking which addresses have been read, the inventive memory managing unit can be adapted to write everything that is written to a memory address in the first memory to a corresponding memory address in the second memory during a start-up phase.

When the memory management unit includes a checking unit which functions to check continuously that the whole of the memory content of the second memory or parts of said memory content is the same as corresponding parts of the first memory during normal parallel operation of the first and second processors, it is proposed in accordance with the invention that the checking unit is adapted to operate solely during the empty time slots detected by the detecting unit.

The present invention can build upon an arrangement that includes first means related to the first memory and second means related to the second memory, said means being adapted to show during a present time slot whether or not the next following time slot will be empty, as the processors operate.

In the case of such an arrangement, it is proposed in accordance with the invention that the detecting unit is adapted to detect empty time slots, by checking whether or not the next following time slot is empty through the medium of said means, therewith enabling it to be shown during a present time slot whether or not the next following time slot is empty.

A means of this nature may include a first flip-flop adapted to show whether or not writing into the memory related to said means will take place during the next following time slot, and a second flip-flop adapted to show whether or not reading from a memory related to said means will take place during the next following time slot and that the status of these flip-flops can be read by the detecting unit in accordance with the invention.

Advantages

In respect of two parallel operating memories belonging to two parallel operating processors and in respect of starting up one of said processors and its memory, the advantages afforded by the inventive method and an inventive arrangement reside in enabling the memory of the start-up processor to be updated without needing to stop the working processor during said update and while enabling the memory bus for ordinary tasks carried out by the working processor to be fully accessed.

In normal parallel operation of the two processors, the present invention also enables the entire memory content, or selected parts of the memory content, of the two parallel operating memories to be checked continuously with full access to the memory bus for standard tasks carried out by the parallel operating processors.

The primary characteristic features of an inventive method are set forth in the characterising clause of the accompanying claim 1, while the primary characteristic features of an inventive arrangement are set forth in the characterising clause of the accompanying Claim 6.

BRIEF DESCRIPTION OF THE DRAWINGS

A method and an arrangement having properties associated with the present invention will now be described by way of example with reference to the accompanying drawings, in which.

DETAILED DESCRIPTION OF PROPOSED-EMBODIMENTS

Figure 1:
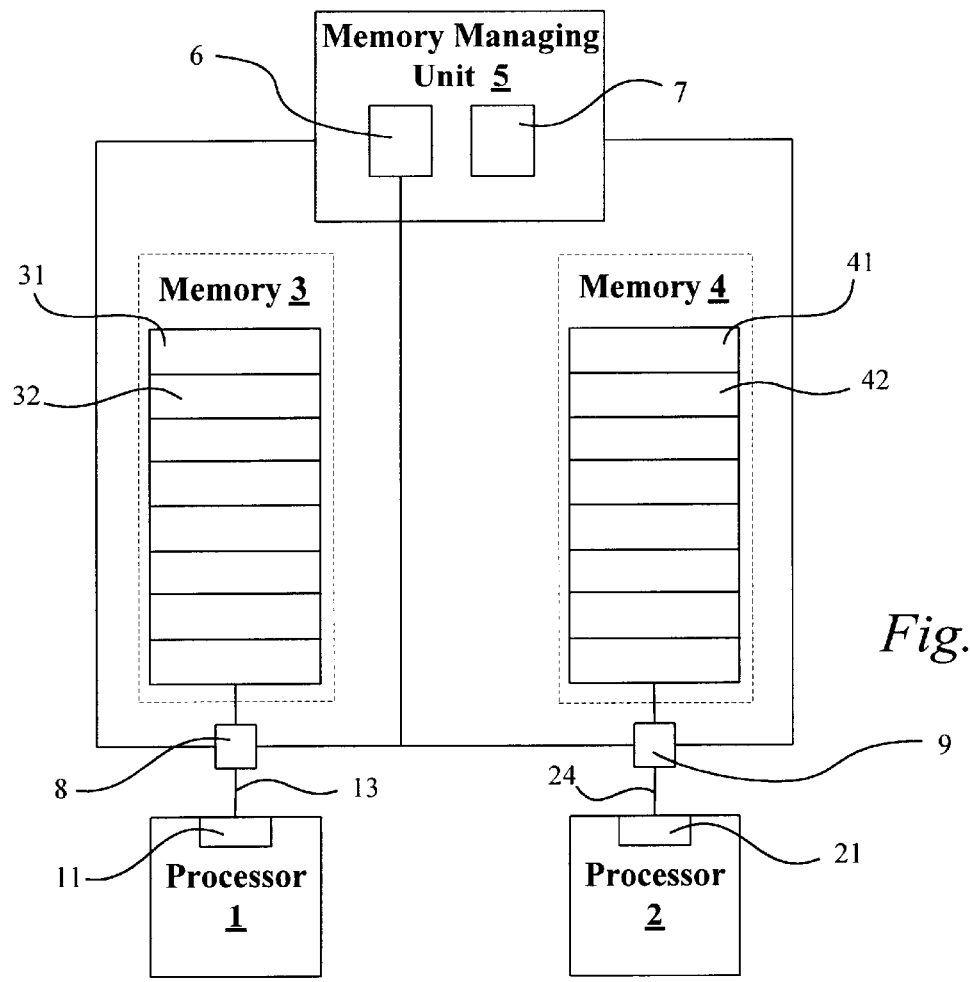
FIG. 1 is a highly simplified, schematic illustration of an arrangement comprising two parallel operating processors adapted to operate in accordance with the present invention.

FIG. 1 illustrates a processor arrangement that includes two parallel operating processors, of which one is an executing processor and the other is a stand-by processor which performs the same tasks as the executing processor and thereby provides redundancy.

Since the exemplifying embodiments described hereinafter are not dependent on whether it is the-stand-by processor or the executing processor that is referred to, these processors will be designated in the following description as a first processor 1 and a second processor 2.

Also shown in FIG. 1 is a first memory 3 and a second memory 4 which operate in parallel, wherein the first memory 3 belongs to the first processor 1 and the second memory 4 belongs to the second processor 2.

These memories 3, 4 are normally primary memories, meaning that their contents are only found when voltage is applied and that the content of the memory will disappear when the voltage is removed. However, the present invention can also be applied with other types of memories.

Respective memories are accessed for reading and/or writing purposes via a memory bus 13, 24, and in time slots correlated. with instruction cycles belonging to the execution work of the processors 1, 2. A few mutually sequential time slots T1, T2, . . . , Tp are shown schematically in FIG. 2.

When parallel operating processors are used with the purpose of obtaining redundancy in a system, the two processors execute identical work. This means that the second memory 4 shall contain the same information as the first memory 3, since the two processors 1, 2 execute the same instructions and should deliver the same result.

If, when checking the memory contents of respective memories 3, 4, it is found that said contents differ from one another, this will indicate that one or both processors has/have processed erroneously, that a write error has taken place in one or both memories, that a read error has taken place from one or both memories, or that one or both memories is/are encumbered with some type of fault, such as a physical memory fault.

This difference in memory contents results in diverse measures being taken to ascertain the reason for the difference, and in some cases it is necessary for one processor to be re-started in order to be able to remedy the fault/error. Normally, the result from the two processors is also checked in order to ensure correct processing of instructions read into the processors. A difference in this respect will also result in certain measures being taken. Since the present invention is not concerned specifically with such management and since it is known to the person skilled in this art how such management shall be carried out, it will not be described in more detail in this document.

It should be mentioned that a processor can access several different types of memory, both primary memory types and disc memory types. However, for the sake of simplicity, the present description refers solely to a primary memory operating with respective processors. It will be understood by the person skilled in this art, however, that the present invention shall be applied when a plurality of memories belonging to respective processors shall be managed in accordance with the present invention.

The memories are managed by a memory managing unit 5. By memory management is meant in this document management that is concerned with ascertaining that the memories fulfil the special requirements placed on memories that operate in parallel processors. This memory management will be described here in the form of a check that is carried out to ascertain whether the contents of the two memories are mutually identical or not, both during normal parallel operation and when re-starting one of said processors.

It will be understood that there is also included memory management which manages the memory access of a processor and other units. This memory management is carried out by an internal unit 11, 21 in a respective processor. An object of the present invention is. to enable the specific memory management that concerns the coaction of the memories in a parallel processor to be carried out separately from the memory management that is carried out. by the internal unit 11, 21, and with full access to the memory bus of the processor and its internal memory management.

It should also be mentioned that the word processor has many different meanings. The word processor as used in this description does not only refer to an ALU (Arithmetic Logical Unit), but also refers to other units that operate around the ALU, such as the internal memory management unit 11, 21, certain internal memories, registers, buffers and more. In simple terms, it can be said that the word processor as used in this description implies everything that has direct or indirect coaction with an ALU and that can access a memory 3, 4 via the internal memory managing unit 11, 21 of the processor.

Since the present invention does not concern the memory management carried by the: internal unit 11, 21, and since such memory management is considered to be known to the person skilled in this art, this management will not be discussed further in this document. In the following, solely the specific management concerning mutual coaction of the memories in a parallel processor will be described.

Figure 2:
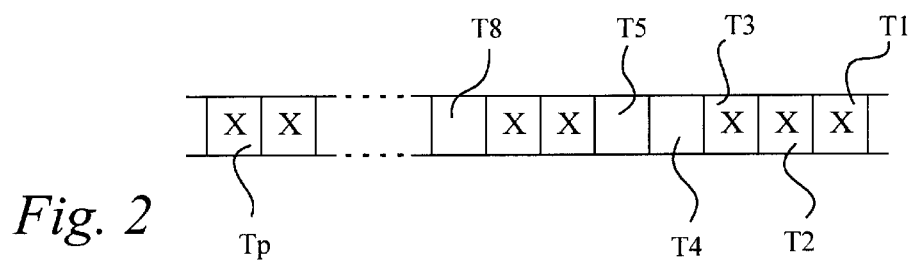
FIG. 2 illustrates schematically a number of mutually sequential time slots through which a processor is able to access a memory.

According to the present invention, memory management involves the detection of empty time slots on the memory bus 13, 24. FIG. 2 illustrates occupied time slots T1, T2, T3, Tp marked with an X and empty time slots T4, T5 and T8.

When an empty time slots T4 is detected, an instruction relating to the memory management concerned is carried out in this time slot.

Thus, memory management instructions are carried out solely in detected empty time slots, meaning that the memory bus 11, 21 is fully accessible for the standard tasks of the processors 1, 2.

In a start-up phase in conjunction with a new start or a re-start of the second processor 2, and therewith the second memory 4, memory management includes writing the memory content of the first memory 3 into the second memory 4.

In this case, the memory content belonging to a first memory address 31 in the first memory 3 shall be read from the first memory and written to a corresponding memory address 41 in the second memory 4. This is done in a first detected empty time slot T4.

The memory content belonging to a second memory address 32 in the first memory 3 shall then be read from the first memory and written to a corresponding memory address 42 in the second memory 4 in a second detected empty time slot T5.

This assumes that the memory content of the second memory 4 is the same as the memory content of the first memory 3.

Because only empty time slots are used, the second memory 4 can be updated, in other words the start-up phase can be carried out, during continued operation of the first processor 1. However, this means that diverse changes may be made in the first memory 3 as the second memory 4 is being updated. Thus, it is proposed in accordance with the invention that all writing to memory addresses that have already been read and belong to the first memory 3 will also be effected in the second memory 4 during the start-up phase.

It is also possible to allow all writing to a memory address in the first memory 3 to be effected to corresponding memory addresses in the second memory 4 during the start-up phase, regardless of the memory address in the first memory 3 to which the writing took place. This results in more writing to the second memory 4 but requires no correlation between the memory addresses in the first memory 3 that have already been read and written into the second memory 4 in relation to the memory address in the first memory 3 into which writing takes place.

During normal parallel operation of the first and the second processor 1, 2, memory management includes checking continuously the entire content of the second memory 4 or parts of said content to ascertain whether or not that this content corresponds to corresponding parts of the first memory 3. According to the present invention, this check is carried out solely during detected empty time slots T4, T5, T8.

FIG. 1 shows a first means 8 that is related to the first memory 3, and a second means 9 that is related to the second memory 4. These means indicate during a present time slot whether the next following time slot is empty or not.

According to the present invention, the means 8, 9 check the memory bus for empty time slots.

The present invention also relates to a memory managing arrangement. FIG. 1 illustrates such an arrangement, which includes a first memory 3 and a second memory 4 that are adapted to operate in parallel, such as two memories belonging to a first processor 1 and a second processor 2 adapted to operate in parallel with each other, and a memory managing unit 5 adapted to manage the first and the second memory 3, 4.

Respective first and second memories may be primary memories, and respective memories are adapted to be accessible for reading and/or writing via a memory bus 13, 24 and correlated in time slots with instruction cycles associated with the execution work of the processors.

The second memory 3 is adapted to contain the same information as the first memory 4.

It is specific to the present invention that the memory managing unit 5 includes a detector unit 6 which functions to detect empty time slots T4, T5, T8, and that said unit 5 is adapted to carry out necessary memory management in these detected empty time slots.

During a start-up phase in conjunction with a new start or re-start of the second processor 2, and therewith the second memory 4, the memory managing unit 5 functions to write the memory content of the first memory 3 into the second memory 4.

In such a start-up phase, the memory managing unit 5 functions to read a memory content associated with a first memory address 31 in the first memory 3 and to write the memory content to a corresponding memory address 41 in the second memory 4 in a first empty time slot T4 detected by the detecting unit 6.

The memory. managing unit 5 also functions to read a memory content associated with a second memory address 32 in the first memory 3 and write the memory content to a corresponding memory address 42 in the second memory 4 in a second empty time slot T5 detected by the detecting unit 6. This procedure is repeated until the memory content of the second memory 4 is the same as the memory content of the first memory 3.

The first processor 1 is adapted to operate continuously during the start-up phase and the memory managing unit 5 may be adapted to write everything written to memory addresses that have already been read in the first memory 3 to corresponding memory addresses in the second memory 4 during said start-up phase.

The memory managing unit 5 may also be adapted to write everything that is written to a memory address in the first memory 3 to a corresponding memory address in the second memory 4 during the start-up phase, regardless of whether the memory content in this address belonging to the first memory 3 has been transferred to. a corresponding address in the second memory 4 or not.

In accordance with the invention, the memory managing unit 5 also includes a checking unit 7 which, during normal parallel operation of the first and second processors 1, 2, functions to check continuously that the memory content of the second memory 4 is the same as corresponding parts of the first memory 3. According to the invention, this check unit 7 is adapted to operate solely during the empty time slots T4, T5, T8 detected by the detecting unit 6.

According to FIG. 1, the arrangement includes first means 8 related to the first memory 3, and second means 9 related to the second memory 4, said means functioning to show during a present time slot whether or not the next following time slot is empty.

According to the present invention, the detecting unit 6 is adapted to detect empty time slots on the memory bus 13, 24, by checking during a present time slot whether the next following time slot is empty or not, through the medium of said means 8, 9.

Figure 3:
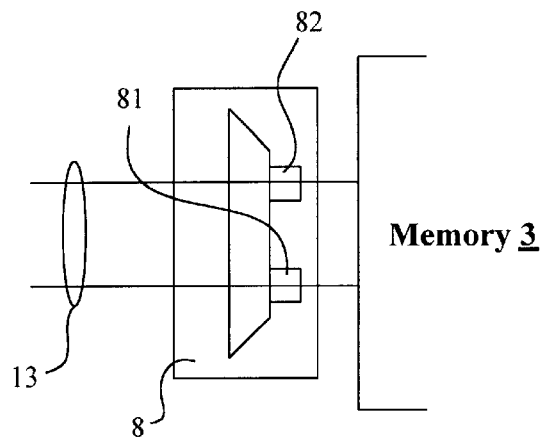
FIG. 3 illustrates schematically means for indicating during a present time slot whether or not the next following time slot is empty,.

As illustrated schematically in FIG. 3, the first means 8 includes a first flip-flop 81 which is adapted to show during a present time slot whether or not writing into the first memory 3 will take place during the next following time slot. The first means also includes a second flip-flop 82 which is adapted to show during a present time slot whether or not reading from the first memory 3 will take place during the next following time slot.

The detecting unit 6 is adapted to read the status of the flip-flops 81, 82, so as to enable said unit to determine during a present time slot whether the next following time slot on the memory bus 13, 24 will be empty or not.

FIG. 3 illustrates schematically the construction and method of operation of the first means 8 related to the first memory 3. It will be understood that the second means 9 related to the second memory 4 is constructed and operates in the same way, even though this is not shown explicitly in the Figures.

It will be understood that although the various embodiments described involve memory management that relates to the updating of one memory when starting up a processor or continuously checking the memory content of the two memories in parallel operation, the present invention can also be applied to carry out other forms of memory management in detected empty time slots, thereby achieving the advantages afforded by the present invention even in this management.

It will also be understood that memory management can include management that cannot wait for empty time slots in accordance with the present invention and consequently it is also possible to carry out certain management in empty time slots in accordance with the present invention and other management directly when so required.

It will also be understood that the invention is not restricted to the aforedescribed exemplifying embodiments thereof and that modifications can be made within the scope of the inventive concept as illustrated in the accompanying Claims.

What is claimed is:

1. A method of memory management, where a first memory and a second memory operate in parallel, respectively operating as two memories belonging to a first and a second parallel operating processor, where respective memories are accessed for read and/or write instructions through a memory bus and correlated in time slots with instruction cycles belonging to the execution work of said processors, and where said second memory shall contain information corresponding to said first memory, wherein said memory management includes:
    detecting empty time slots on said memory bus, wherein said memory management is performed solely in said detected empty time slots; and
    writing of a memory content of said first memory into said second memory during a start-up phase in conjunction with a new start or a re-start of said second processor and therewith said second memory, wherein:
        a memory content belonging to a first memory address in said first memory is read from said first memory and written to a corresponding memory address in said second memory in a first detected empty time slot, wherein a memory content belonging to a second memory address in said first memory is read from said first memory and written to a corresponding memory address in said second memory in a second detected empty time slot, this procedure being repeated until the memory content of said second memory is the same as the memory content of said first memory;
        said start-up phase is performed during continuous operation of said first processor; and
        all write instructions to memory addresses that have already been read and belong to said first memory are also written into said second memory during said start-up phase.

2. A method according to claim 1, in which during normal parallel operation of the first and second processors said memory management includes checking continuously that the entire content of said second memory or parts of said content are the same as corresponding parts of said first memory, wherein said check is carried out solely during detected empty time slots.

3. A method according to claim 1, where first means related to said first memory and second means related to said second memory show during a present time slot whether a next following time slot is empty or not, wherein said detection is controlled by said means.

4. A method of memory management, where a first memory and a second memory operate in parallel, respectively operating as two memories belonging to a first and a second parallel operating processor, where respective memories are accessed for read and/or write instructions through a memory bus and correlated in time slots with instruction cycles belonging to the execution work of said processors, and where said second memory shall contain information corresponding to said first memory, wherein said memory management includes:
    detecting empty time slots on said memory bus, wherein said memory management is performed solely in said detected empty time slots; and
    writing of a memory content of said first memory into said second memory during a start-up phase in conjunction with a new start or a re-start of said second processor and therewith said second memory, wherein:
        a memory content belonging to a first memory address in said first memory is read from said first memory and written to a corresponding memory address in said second memory in a first detected empty time slot, wherein a memory content belonging to a second memory address in said first memory is read from said first memory and written to a corresponding memory address in said second memory in a second detected empty time slot, this procedure being repeated until the memory content of said second memory is the same as the memory content of said first memory;
        said start-up phase is performed through continuous operation of the first processor; and
        all write instructions to a memory address in said first memory are also written into a corresponding memory address in said second memory during said start-up phase.

5. A method according to claim 4, in which during normal parallel operation of the first and second processors said memory management includes checking continuously that the entire content of said second memory or parts of said content are the same as corresponding parts of said first memory, wherein said check is carried out solely during detected empty time slots.

6. A method according to claim 4, where first means related to said first memory and second means related to said second memory show during a present time slot whether a next following time slot is empty or not, wherein said detection is controlled by said means.

7. A memory managing arrangement comprising:
    a first and a second memory which are adapted to operate in parallel, respectively operating as two memories belonging to a first and a second processor adapted to operate in parallel with one another; and
    a memory managing unit which is adapted to manage said first and second memories, wherein respective memories are accessible for read and/or write instructions via a memory bus and correlated in time slots with instruction cycles belonging to execution work adapted to said processors, and wherein said second memory is adapted to contain information corresponding to said first memory, wherein said memory managing unit includes a detecting unit which functions to detect empty time slots on said memory bus, and wherein said arrangement is adapted to perform memory management solely in the detected empty time slots,
wherein in said memory management arrangement:
during a start-up phase in conjunction with a new start or a re-start of said second processor and therewith said second memory, the memory managing unit functions to write the memory content of the first memory into said second memory, wherein the memory managing unit is adapted to read a memory content belonging to a first memory address in said first memory and to write said memory content to a corresponding memory address in said second memory in a first empty time slot detected by said detecting unit;
said memory managing unit is adapted to read a memory content belonging to a second memory address in said first memory and to write said memory content to a corresponding memory address in said second memory in a second empty time slot detected by said detecting unit, wherein said procedure is repeated until the memory content of said second memory is the same as the memory content in said first memory;
said first processor is adapted to operate continuously during said start-up phase; and
the memory managing unit is adapted to write everything that has been written to memory addresses in said first memory that have already been read to corresponding memory addresses in said second memory during said start-up phase.

8. An arrangement according to claim 7, in which said memory managing unit includes a checking unit which during normal parallel operation of said first and second processors functions to continuously check that the entire contents of said second memory parts of said contents are the same corresponding parts of said first memory, wherein the checking unit is adapted to operate solely during empty time slots detected by said detecting unit.

9. A memory managing arrangement comprising:
a first and a second memory which are adapted to operate in parallel, respectively operating as two memories belonging to a first and a second processor adapted to operate in parallel with one another; and
a memory managing unit which is adapted to manage said first and second memories, wherein respective memories are accessible for read and/or write instructions via a memory bus and correlated in time slots with instruction cycles belonging to execution work adapted to said processors, and wherein said second memory is adapted to contain information corresponding to said first memory, wherein said memory managing unit includes a detecting unit which functions to detect empty time slots on said memory bus, and wherein said arrangement is adapted to perform memory management solely in the detected empty time slots,
wherein in said memory management arrangement:
during a start-up phase in conjunction with a new start or a re-start of said second processor and therewith said second memory, the memory managing unit functions to write the memory content of the first memory into said second memory, wherein the memory managing unit is adapted to read a memory content belonging to a first memory address in said first memory and to write said memory content to a corresponding memory address in said second memory in a first empty time slot detected by said detecting unit;
said memory managing unit is adapted to read a memory content belonging to a second memory address in said first memory and to write said memory content to a corresponding memory address in said second memory in a second empty time slot detected by said detecting unit, wherein said procedure is repeated until the memory content of said second memory is the same as the memory content in said first memory;
said first processor is adapted to operate continuously during said start-up phase; and
said memory managing unit is adapted to write everything that is written to a memory address in said first memory to a corresponding memory address in said second memory during the said start-up phase.

10. An arrangement according to claim 9, in which said memory managing unit includes a checking unit which during normal parallel operation of said first and second processors functions to continuously check that the entire contents of said second memory parts of said contents are the same corresponding parts of said first memory, wherein the checking unit is adapted to operate solely during empty time slots detected by said detecting unit.

11. A memory managing arrangement comprising:
a first and a second memory which are adapted to operate in parallel, respectively operating as two memories belonging to a first and a second processor adapted to operate in parallel with one another;
a memory managing unit which is adapted to manage said first and second memories, wherein respective memories are accessible for read and/or write instructions via a memory bus and correlated in time slots with instruction cycles belonging to execution work adapted to said processors, and wherein said second memory is adapted to contain information corresponding to said first memory, wherein said memory managing unit includes a detecting unit which functions to detect empty time slots on said memory bus, and wherein said arrangement is adapted to perform memory management solely in the detected empty time slots; and
first means related to said first memory and second means related to said second memory, said means being adapted to show whether the next following time slot is empty or not during a present time slot, wherein said detecting unit is adapted to detect empty time slots by checking whether a next following time slot is empty or not through the medium of said means, and respective means include a first flip-flop which functions to show whether writing of instructions into a memory related to said means will take place during a next following time slot, and a second flip-flop which is adapted to show whether reading from a memory related to said means will take place during the next following time slot; and in that the status of said flip-flops can be read by said detecting unit.

12. An arrangement according to claim 11, in which said memory managing unit includes a checking unit which during normal parallel operation of said first and second processors functions to continuously check that the entire contents of said second memory parts of said contents are the same corresponding parts of said first memory, wherein the checking unit is adapted to operate solely during empty time slots detected by said detecting unit.

* * * * *

UNITED STATES PATENT AND TRADEMARK OFFICE
CERTIFICATE OF CORRECTION

PATENT NO. : 6,425,063 B1
DATED : July 23, 2002
INVENTOR(S) : Bjorn Axel Mattson et al.

It is certified that error appears in the above-identified patent and that said Letters Patent is hereby corrected as shown below:

<u>Title page,</u>
Item [73], below the inventors names, insert the following:
-- [73] Assignee: Telefonaktiebolaget LM Ericsson, Stockholm, Sweden --

Signed and Sealed this

Twenty-sixth Day of November, 2002

Attest:

Attesting Officer

JAMES E. ROGAN
*Director of the United States Patent and Trademark Office*